US008255564B2

(12) United States Patent
Fillebrown et al.

(10) Patent No.: US 8,255,564 B2
(45) Date of Patent: Aug. 28, 2012

(54) PERSONAL VIDEO NETWORK

(75) Inventors: Lisa A Fillebrown, Allen, TX (US);
Russell D. Kautz, The Colony, TX (US);
Kenneth Matthew Glover, Coppell, TX (US)

(73) Assignee: Enfora, Inc., Plano, TX (US)

( * ) Notice: Subject to any disclaimer, the term of this patent is extended or adjusted under 35 U.S.C. 154(b) by 817 days.

(21) Appl. No.: 11/698,745

(22) Filed: Jan. 26, 2007

(65) Prior Publication Data
US 2007/0214213 A1 Sep. 13, 2007

Related U.S. Application Data

(62) Division of application No. 09/773,885, filed on Feb. 1, 2001, now abandoned.

(60) Provisional application No. 60/212,203, filed on Jun. 16, 2000.

(51) Int. Cl.
*G06F 15/173* (2006.01)

(52) U.S. Cl. .................... 709/238; 709/203; 709/217

(58) Field of Classification Search .................. 709/203, 709/217–219, 230, 238, 247
See application file for complete search history.

(56) References Cited

U.S. PATENT DOCUMENTS

| | | | | |
|---|---|---|---|---|
| 5,392,353 | A | * | 2/1995 | Morales ........................ 380/211 |
| 5,574,966 | A | * | 11/1996 | Barzegar et al. .............. 455/507 |
| 5,636,220 | A | | 6/1997 | Vook et al. |
| 5,786,921 | A | | 7/1998 | Wang et al. |
| 5,796,727 | A | | 8/1998 | Harrison et al. |
| 5,822,324 | A | * | 10/1998 | Kostresti et al. .............. 370/487 |
| 5,860,023 | A | | 1/1999 | Tognazzini |
| 5,862,452 | A | | 1/1999 | Cudak et al. |
| 5,956,331 | A | | 9/1999 | Rautiola et al. |
| 6,047,165 | A | | 4/2000 | Wright et al. |
| 6,052,696 | A | | 4/2000 | Euler et al. |
| 6,108,314 | A | | 8/2000 | Jones et al. |
| 6,108,727 | A | | 8/2000 | Boals et al. |
| 6,157,630 | A | | 12/2000 | Adler et al. |
| 6,195,501 | B1 | * | 2/2001 | Perry et al. ....................... 386/83 |
| 6,216,001 | B1 | | 4/2001 | Ghirnikar et al. |
| 6,286,003 | B1 | | 9/2001 | Muta |
| 6,356,905 | B1 | | 3/2002 | Gershman et al. |
| 6,359,872 | B1 | | 3/2002 | Mahany et al. |
| 6,396,820 | B1 | | 5/2002 | Dolan et al. |
| 6,397,259 | B1 | | 5/2002 | Lincke et al. |
| 6,466,964 | B1 | | 10/2002 | Leung et al. |
| 6,484,011 | B1 | | 11/2002 | Thompson et al. |
| 6,526,335 | B1 | | 2/2003 | Treyz et al. |
| 6,542,491 | B1 | | 4/2003 | Tari et al. |
| 6,560,214 | B1 | | 5/2003 | Kikinis |
| 6,584,095 | B1 | | 6/2003 | Jacobi et al. |
| 6,590,928 | B1 | | 7/2003 | Haartsen |

(Continued)

OTHER PUBLICATIONS

Bradley, et al., "Wireless Personal Area Networks: An Overview of the IEEE P802.15 Working Group," Mobile Computing Communications Review, vol. 4, No. 1, Jan. 2000, pp. 26-33.

(Continued)

*Primary Examiner* — Philip B Tran

(57) ABSTRACT

The invention is a personal wireless network that generally comprises at least a lightweight wireless client to send and receive audio and video from another system component. The personal wireless network also provides a wireless-enabled routing component, which stands alone to route traffic within the personal wireless network. Also provided is a transmitter component that connects to a computing device, such as a server and sends and receives data Furthermore, a software algorithm provides a method for supporting a personal wireless network.

20 Claims, 5 Drawing Sheets

U.S. PATENT DOCUMENTS

| | | |
|---|---|---|
| 6,600,726 B1 | 7/2003 | Nevo et al. |
| 6,608,841 B1 | 8/2003 | Koodli |
| 6,629,143 B1 | 9/2003 | Pang |
| 6,650,871 B1 | 11/2003 | Cannon et al. |
| 6,678,215 B1 | 1/2004 | Treyz et al. |
| 6,681,259 B1 | 1/2004 | Lemilainen et al. |
| 6,683,865 B1 | 1/2004 | Garcia-Luna-Aceves et al. |
| 6,691,227 B1 | 2/2004 | Neves et al. |
| 6,711,380 B1 | 3/2004 | Callaway, Jr. |
| 6,721,787 B1 | 4/2004 | Hiscock |
| 6,766,165 B2 | 7/2004 | Sharma et al. |
| 6,894,988 B1 | 5/2005 | Zehavi |
| 6,963,759 B1 | 11/2005 | Gerson |
| 7,035,897 B1 * | 4/2006 | Devereaux et al. ........... 709/203 |
| 7,260,078 B1 | 8/2007 | Ledsham et al. |
| 2001/0030850 A1 | 10/2001 | Ditzik |

OTHER PUBLICATIONS

McClard, et al., "Unleashed: Web Tablet Integration Into the Home," ACM, Apr. 2000.

Office Action issued on Dec. 2, 2008 in U.S. Appl. No. 11/977,750, filed Oct. 25, 2007.

Anne McClard, et al., "Unleashed: Web Tablet Integration into the Home," CHI Letters, vol. 2, issue 1, Apr. 1-6, 2000, pp. 1-8.

* cited by examiner

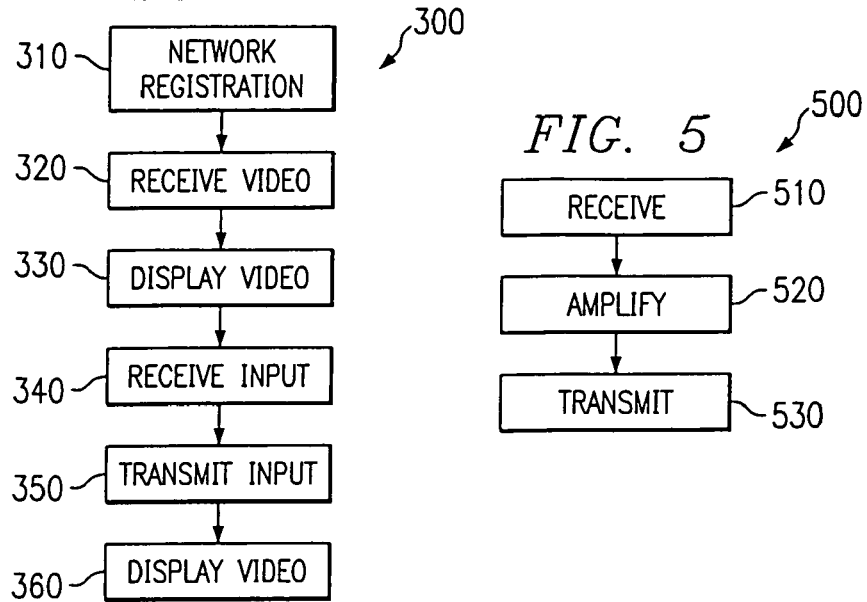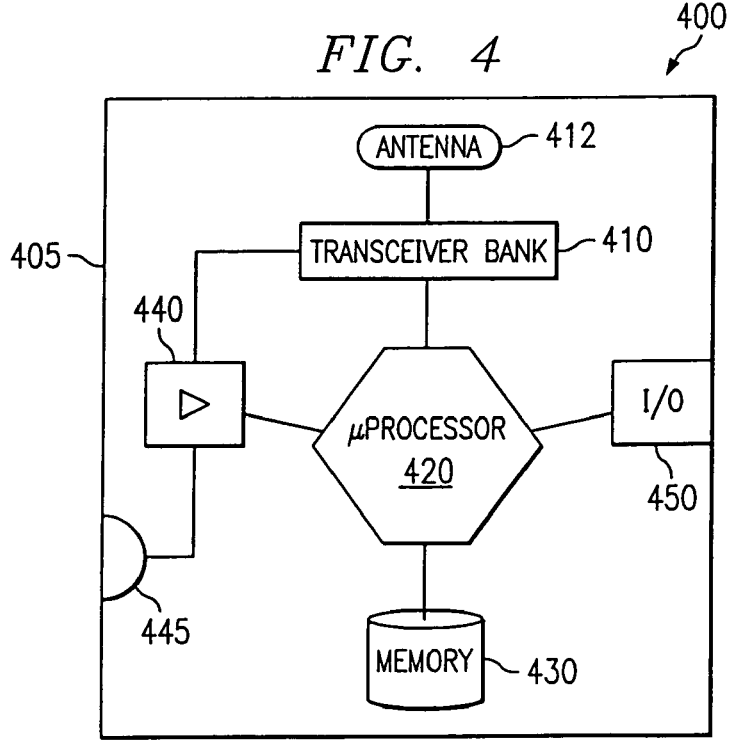

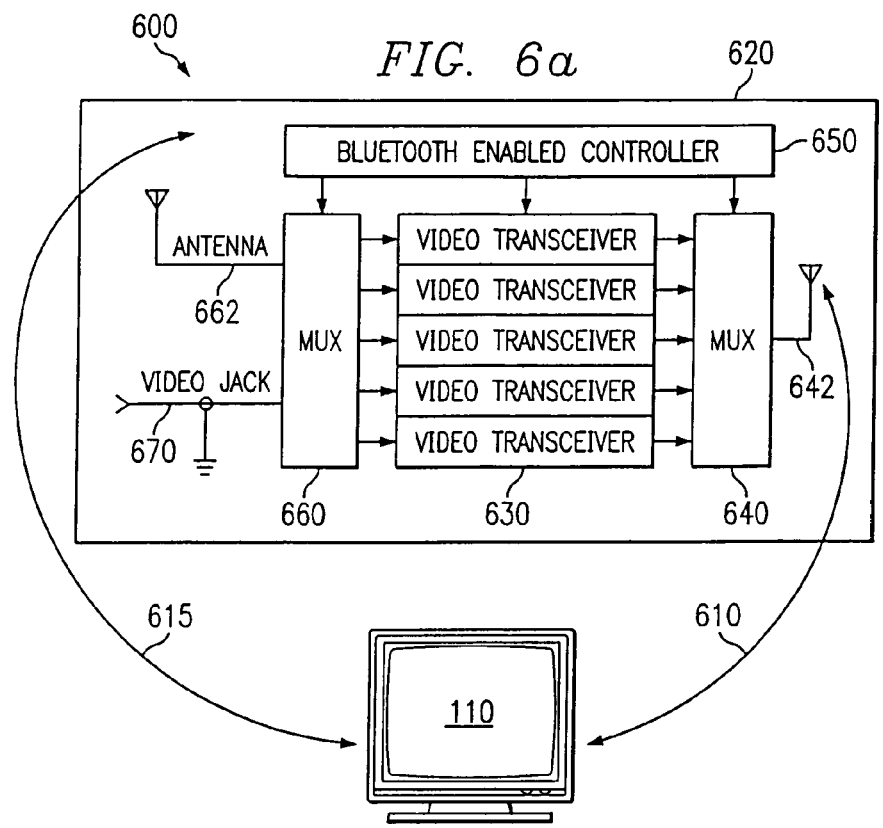
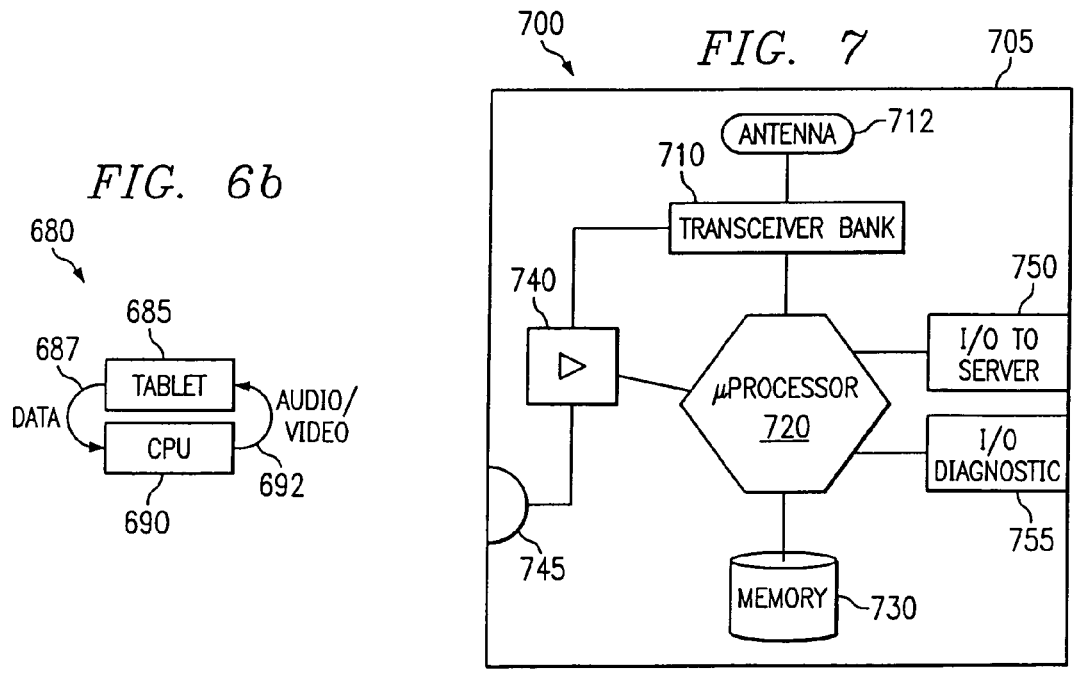

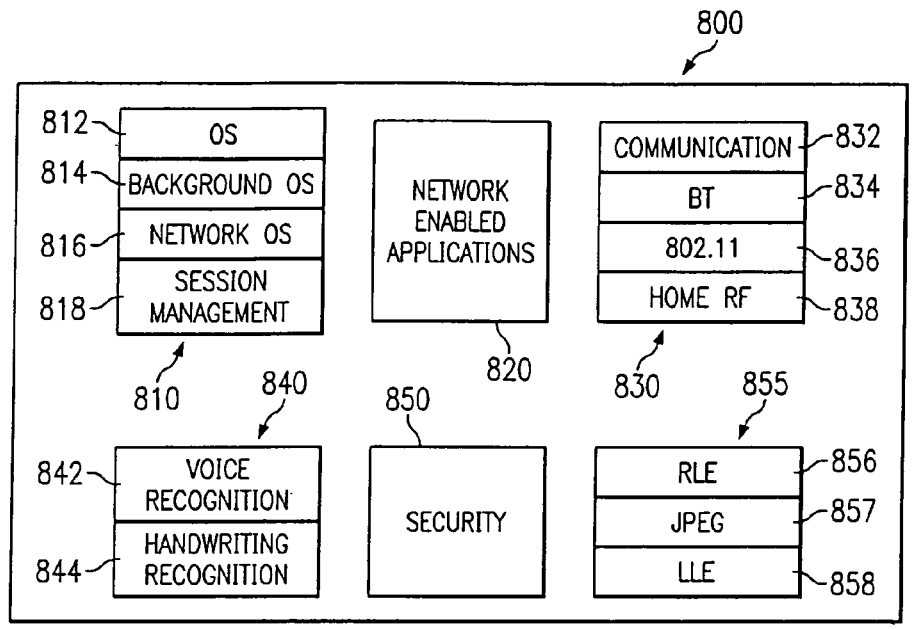
FIG. 8
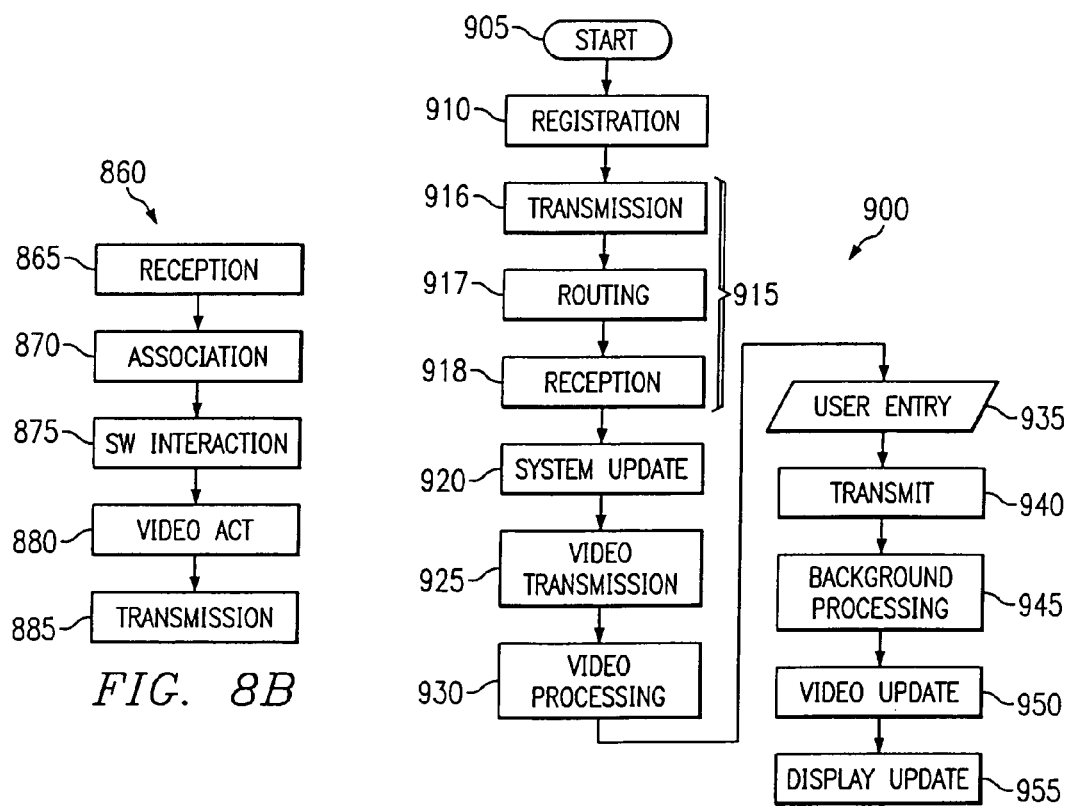
FIG. 8B
FIG. 9

PERSONAL VIDEO NETWORK

CROSS REFERENCE TO RELATED APPLICATIONS

This application is a divisional application of prior application Ser. No. 09/773,885 filed on Feb. 1, 2001 now abandoned, which claims priority from U.S. Patent application Ser. No. 60/212,203 entitled PERSONAL WIRELESS NETWORK by Fillebrown, et al., which was filed on Jun. 16, 2000.

TECHNICAL FIELD

Generally, the invention relates to computer networks and wireless devices, and, more particularly, the invention relates to wireless computer networks. More specifically still, the invention relates to wirelessly providing, through thin clients, access to software applications executing on a server.

Statement of a Problem Addressed by this Invention

As the need for computer power has proliferated, many homes and businesses have implemented networks of computers. Computer networks facilitate access to widely needed data, and provide common access to computer programs. In addition, computer networks provide the added advantage of reducing the licensing fees associated with purchasing multiple copies of software.

Examples of computer networks include Local Area Networks (LANs) and Wide Area Networks (WANs). A LANs provides common client access to at least one computer server, and typically encompasses a single facility. Similarly, a WAN provides common computing access to clients by connecting multiple networks (including LANs). A WAN is commonly used to connect multiple facilities that are geographically diverse.

Generally, a LAN provides network access through at least one server which is hardwire connected through twisted pair or coaxial cables used to connect serial or parallel ports. Common types of LANs are implemented via Ethernet or token-ring standards, and these standards are implemented through servers running network software such as Novell Network or Windows NT Network software.

Commonly, a WAN may include one or more LANs, and also may include remote servers which are connected through data cables known as trunk lines that may be implemented as copper wires or fiberoptic cables. Unfortunately, LANs and WANs are limited in that hardwire port-connections are required to connect a client (typically, a computer) with servers or to provide access to other networks.

Accordingly, the use of network components, such as client and server computers as well as network-enabled communications equipment, has posed a challenge because each network component has to be able to communicate across the network. This requires, at a minimum, that each network component have the connect cable type and cable connection, the correct PC card type, and the correct software to perform even the simplest tasks. Then, the network component software must be integrated and optimized with the network software. Fortunately, simple wireless options for connecting devices and networks together are emerging.

One wireless option is to use infrared communication technology. Network devices that use infrared communications as a means for transmitting data have enabled the cost effective integration of infrared components into an array of devices. For example, some keyboards use infrared technology to enable a keyboard to communicate wirelessly with a computer. This allows a user more flexibility in placing their keyboard. In addition, some laptops can communicate with a computer by using an infrared port. As another example, some cellular telephones can use infrared ports to transfer data to or from another similar cellular phone. Accordingly, today many computing devices and some cellular telephones have infrared ports, and infrared technology is being touted as an easy way to provide short range wireless connections between devices. However, there are some drawbacks in using infrared communications.

For example, infrared communications require the devices that are communicating to be within a "line of sight" of each other. In other words, the actual infrared ports of the devices must physically be able to visually see each other without obstruction. Also, sunlight and some artificial light sources can cause interference (their light often contains light from the infrared spectrum).

To overcome these and other disadvantages associated with available wireless data communications, many corporate leaders came together to develop a short range wireless solution called Bluetooth. Bluetooth is implemented as a standardized protocol for short-range data communication using unlicensed radio frequencies. Today, thousands of companies are designing products that will utilize Bluetooth technology.

Bluetooth technology operates in a 2.4 GHz Industrial Scientific and Medical (ISM) band of the unlicensed radio spectrum. This portion of the spectrum was chosen because of its international availability and its unrestricted use. Furthermore, Bluetooth transmissions do not require a line of sight to operate.

Another wireless LAN standard that is gaining popularity is the IEEE 802.11 standard and its successors (known today as 802.11 b, etc.; hereinafter, all of the 802.11 standards are referred to collectively as "802.11" unless explicitly stated otherwise). In 802.11, there are two different ways to configure a network: ad-hoc and infrastructure. In the ad-hoc configuration, computers are brought together to form a network "on the fly."

In the ad-hoc configuration of a wireless network, there is no structure to the wireless network, there are no fixed points, and usually every device in the network is able to communicate with every other device. As an example, consider a meeting where employees bring laptop computers together to share information. Although it seems that order would be difficult to maintain in this type of network, algorithms (such as the spokesman election algorithm (SEA)) have been designed to "elect" one laptop (or other available device) as a base station (or "master") of the network—the other laptops and local devices are then designated as slaves. Other algorithms in ad-hoc network architectures use a broadcast and flooding method establish who's who in the network.

In contract to the ad-hoc configuration, the infrastructure LAN network configuration uses fixed network access points with which mobile devices, such as laptops, can communicate. This configuration is similar to a cellular network. Network access points are sometime connected to landlines to widen the LAN's capability by bridging wireless nodes to other wired nodes. As in cellular networks, if service areas overlap, handoffs can occur.

Despite the availability of wireless LAN protocols, there exist needs for networks and for network components that allow a user to wirelessly access software applications executing on a server, or to access data needed by multiple clients within a network. Furthermore, it would be advantageous to provide network access through an inexpensive thin client.

Selected Overview of Selected Embodiments

The present invention achieves technical advantages as systems, devices, methods, and software that implement a personal wireless network. The personal wireless network generally comprises a lightweight wireless tablet (that preferably provides a color touch-screen display), and incorporates wireless technology, such as Bluetooth or 802.11, to send and receive audio and video from another system component.

The personal wireless network also provides a wireless-enabled routing component, which stands alone to route data traffic within the personal wireless network (via the network's wireless protocols). In addition, the personal wireless network provides a transmitter component that connects to a computing device such as a server (or network-dedicated device), and processes wireless protocols in order to send and receive data, audio, and video packets (via the network's choice wireless protocol). Hereinafter, the term "packet" is used to refer collectively to a data, audio, and video packet. Furthermore, software algorithms provide methods for supporting a personal wireless network through the management of the data networking and application management functions within a computer which functions as a server for the personal wireless network. Accordingly, a personal wireless network is provided that is inexpensive, scaleable, and flexible.

In one embodiment the invention is a personal wireless network. The personal wireless network includes a wireless server, a wireless transmitter, and a wireless client capable of wireless communication with the wireless transmitter. More generally, the invention provides a personal wireless network having a wireless serving means, a wireless transmission means, and a wireless client means capable of wireless communication with the wireless transmission means.

In another embodiment, the invention provides a personal wireless system. The system has a server subsystem, a transmitter subsystem, and a client subsystem.

Of course, other embodiments will be apparent to those of ordinary skill in the art.

To practice the invention, software embodiments of a method may be loaded onto a computing platform and then executed according to the method. Furthermore, the invention may be embodied on a software medium, such as a CD ROM, or transmitted over the Internet as a data signal. Of course, other embodiments will be apparent to those of ordinary skill in the art.

BRIEF DESCRIPTION OF THE DRAWINGS

Various aspects of the invention, as well as an embodiment, are better understood by reference to the following EXEMPLARY EMBODIMENT OF A BEST MODE. To better understand the invention, the EXEMPLARY EMBODIMENT OF A BEST MODE should be read in conjunction with the drawings in which:

FIG. 3 is a process flow diagram of a registration algorithm;

FIG. 4 illustrates a block diagram of a wireless router (the router);

FIG. 5 illustrates the functionality of the router as a routing algorithm;

FIG. 6A illustrates a video display system for use in a personal wireless network FIG. 6B illustrates an embodiment of a tablet interaction algorithm;

FIG. 7 illustrates one embodiment of a wireless transmitter;

FIG. 8 illustrates one embodiment of a personal wireless network software block;

FIG. 8B provides the process diagrams of a wireless server algorithm; and

FIG. 9 is a block flow diagram of a personal wireless network processing algorithm.

AN EXEMPLARY EMBODIMENT OF A BEST MODE

Figure 1:
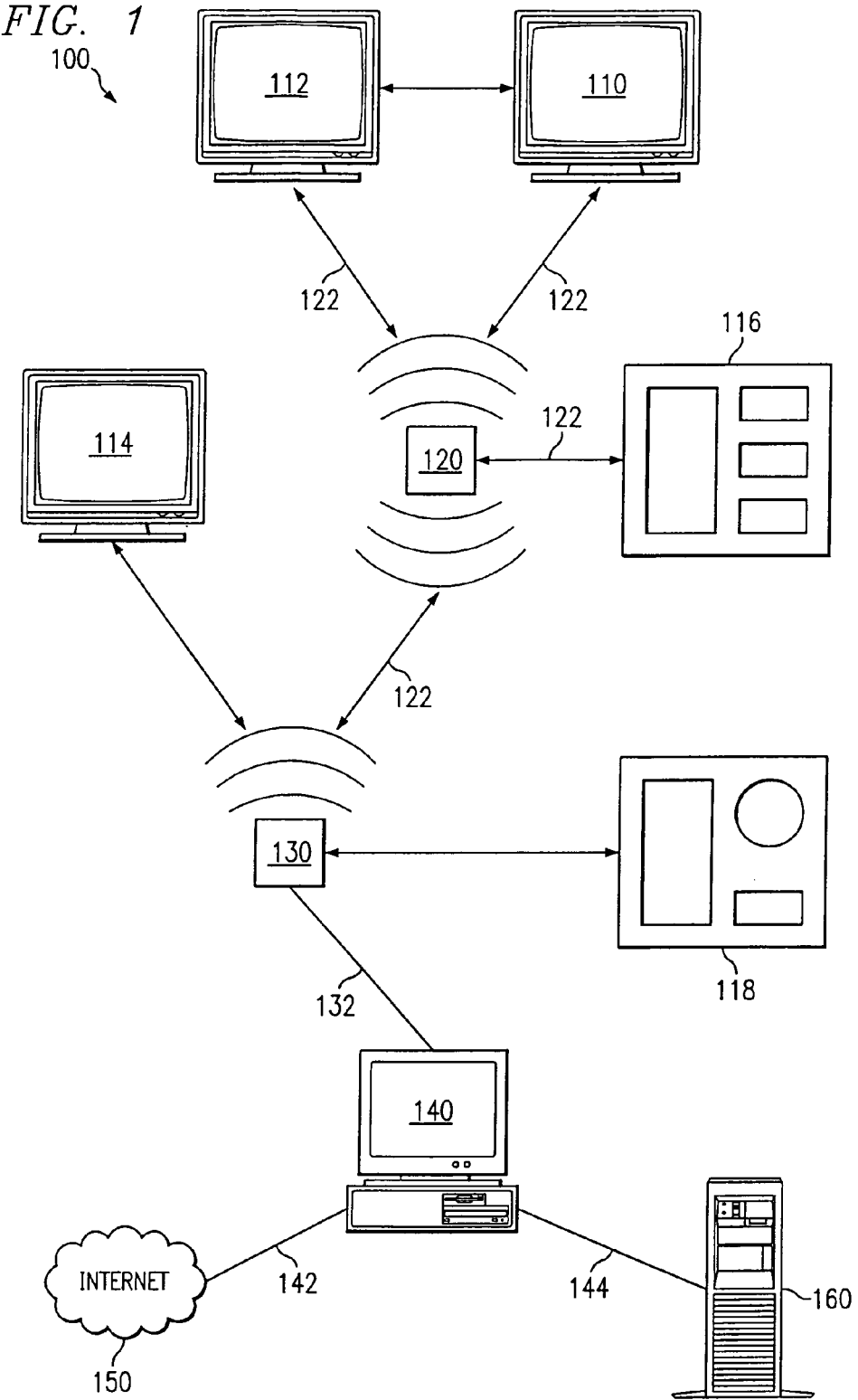
FIG. 1 illustrates a typical personal wireless network.

A personal wireless network is provided that is inexpensive, scaleable, and flexible. The invention is a personal wireless network. The personal wireless network generally comprises a lightweight wireless thin client (or tablet), and incorporates wireless technology to send and receive audio and video from another system component. The personal wireless network also provides a wireless-enabled routing component, which stands alone to route data traffic. The personal wireless network also provides a transmitter component that connects to a computing device, such as a server that sends and receives audio and video. Furthermore, software algorithms provide methods for supporting a personal wireless network through the management of the data networking and application management functions.

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results In a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching"). Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for-functioning-" or "step for-functioning-" in the Claims section.

Computer Systems as Software Platforms

A computer system (or, system) typically includes hardware capable of executing machine-readable instructions, as well as the software for executing acts (typically machine-readable instructions) that produce a desired result. In addition, a computer system may include hybrids of hardware and software, as well as computer sub-systems.

Hardware generally includes processor-capable platforms, such as client machines (also known as personal computers or servers), and hand-held processing devices (such as smart phones, personal digital assistants (PDAs), or personal computing devices (peDs), for example. Furthermore, hardware typically includes any physical devices that are capable of storing machine readable instructions, such as memory or other data storage devices. Other forms of hardware include hardware sub-systems, including transfer devices such as modems, modem cards, ports, and port cards, for example. The way hardware is organized within a system is known as the system's architecture (discussed below).

Software includes machine code stored in memory, such as RAM or ROM, or machine code stored on devices (such as floppy disks, or a CD ROM, for example). Software may include executable code, an operating system, or source or object code, for example. In addition, software encompasses any set of instructions capable of being executed in a client machine or server—and, in this form, is often called a program or executable code.

Programs often execute in portions of code at a time. These portions of code are sometimes called modules or code-segments. Often, but not always, these code segments are identified by a particular function that they perform. For example, a counting module (or "counting code segment") may monitor the value of a variable. Furthermore, the execution of a code segment or module is sometimes called an act. Accordingly, software may be used to perform a method which comprises acts. In the present discussion, sometimes acts are referred to as steps to help the reader more completely understand the exemplary embodiment.

Software also includes description code. Description code specifies variable values and uses these values to define attributes for a display, such as the placement and color of an item on a displayed page. For example, the Hypertext Transfer Protocol (HTTP) is the software used to enable the Internet and is a description software language.

Hybrids (combinations of software and hardware) are becoming more common as devices for providing enhanced functionality and performance to computer systems. A hybrid is created when traditionally software functions are directly manufactured into a silicon chip—this is possible since software may be assembled and compiled into ones and zeros, and, similarly, ones and zeros can be represented directly in silicon. Typically, the hybrid (manufactured hardware) functions are designed to operate seamlessly with software. Accordingly, it should be understood that hybrids and other combinations of hardware and software are also included within the definition of a computer system and are thus envisioned by the invention as possible equivalent structures and equivalent methods.

Computer sub-systems are combinations of hardware or software (or hybrids) that perform some specific task. For example, one computer sub-system is a soundcard. A soundcard provides hardware connections, memory, and hardware devices for enabling sounds to be produced and recorded by a computer system. Likewise, a soundcard may also include software needed to enable a computer system to "see" the soundcard, recognize the soundcard, and drive the soundcard.

Sometimes the methods of the invention may be practiced by placing the invention on a computer-readable medium. Computer-readable mediums include passive data storage, such as a random access memory (RAM) as well as semi-permanent data storage such as a compact disk read only memory (CD-ROM). In addition, the invention may be embodied in the RAM of a computer and effectively transform a standard computer into a new specific computing machine.

Data structures are defined organizations of data and enable an embodiment of the invention. For example, a data structure may provide an organization of data, or an organization of executable code (executable software). Furthermore, data signals are carried across transmission mediums and store and transport various data structures, and, thus, may be used to transport the invention. It should be noted in the following discussion that acts with like names are performed in like manners, unless otherwise stated.

FIG. 1 illustrates a typical personal wireless network 100. Generally, in the personal wireless network 100, a plurality of wireless clients, such as wireless tablets and wireless smart appliances communicate via a wireless routing means, such as a wireless router 120, with a wireless server 140, sometimes through a wireless transceiving means 130. Communication standards in the personal wireless network 100 are preferably broadcastable wireless protocols, such as Bluetooth, IEEE 802.11, Home RF, or other wireless protocols.

For the personal wireless network 100, preferably a wireless protocol implemented at 2.4 GHz. Of course, other wireless protocols can be implemented and other communication frequencies may be used as well. Furthermore, multiple wireless protocols and communication frequencies may coexist within a personal wireless network.

Wireless protocols typically transmit information by packetizing information. Packetizing information involves organizing information into units known as packets. Packets may be grouped according to packets which carry pure data (true "data packets"), packets which carry video (sometimes called "video packets"), and packets which carry pure audio (sometimes called "audio packets"). Hereinafter, the term "packet" will be used to refer to all types of packetized information. Furthermore, hereinafter, a type-specific packet (such as a data-only packet) will be capitalized, such as with "Data packet" to emphasize that the packet is of a specific type.

Accordingly, a wireless protocol used to implement the present invention will preferably implement the wireless protocol through packeting. However, it should be understood that non-packetized information might be transmitted across a wireless network. For example, common UHF channels may be used to transmit video and audio information within a wireless network. Furthermore, as advances in wireless communication takes place, additional protocols and variations of existing protocols may be used to implement wireless communications within a personal wireless network.

Wireless client means include devices that a user may use to access a function provided by a personal wireless network 100. For example, a user may choose to use a wireless client, such as a wireless tablet 110, to access a software application that is provided by the wireless server 140.

Likewise, a user using the wireless tablet 110 may also communicate directly with another user using a wireless tablet 112, or another user using a wireless tablet 114. The communications between the wireless tablets 110, 112, and 114, may include both audio and visual communication. Similarly, a user using the wireless tablet 110 may access wireless smart appliance specific applications associated with specific wireless smart appliances.

A wireless smart appliance is an appliance or device that has a wireless network compatible processing system. Common appliances implemented as wireless smart appliances include radios, televisions, cable boxes, lights, alarms, ovens, washers, dryers, water faucets, heating oil pumps, and thermostats, for example. As a specific example, the user using the wireless tablet 110 may access a wireless smart appliance implemented as a microwave oven 116. Thus, the wireless tablet 110 may allow a user to program a cooking time for the microwave oven 116 remotely.

Furthermore, a user at the wireless tablet 110 may wish to program the microwave oven 116 to cook popcorn at a time coinciding with the beginning of a movie video being rented, or viewed within the personal wireless network 100 via the wireless server 140. Similarly, a user with a wireless tablet 110 may control a second wireless smart appliance, such as a radio 118, so that music may be heard through out or at any specific location in the facility maintaining the wireless tablet 110.

Of course, it should be understood that although wireless tablets are illustrated as specific embodiments of a wireless client, it should be understood that many other wireless client means may be utilized, and it should be understood that a wireless client means is any device capable of wirelessly communicating within a personal wireless network and also capable of user interaction with other devices within the personal wireless network.

Information transmitted across the personal wireless network 100 through wireless communication protocols is achieved preferably through a wireless transceiving means, illustrated as the wireless transmitter 130.

In one embodiment, the wireless transmitter 130 is connected via a cable 132 with the wireless server 140. The cable 132 can be provided as a Universal Synchronous Bus (USB) cable, a parallel cable, or a Split-Bridge cable, for example.

Of course, it should be understood that although the wireless transmitter is illustrated as connected via a cable to the wireless server, it should be understood that any other means of connection between the wireless transmitter and the wireless server may be utilized, and it should be understood that a wireless transmitter means is any device capable of passing information between a wireless transmitter and a wireless server.

Accordingly, when operating "downstream" (when data, packets, or information flow from the wireless server 140 to a wireless client), the wireless transmitter 130 preferably receives a Video packet and/or Data packet. The wireless transmitter 130 is also capable of transmitting packets in the personal wireless network 100 so that a packet may be received by a wireless client means or a wireless routing means.

The personal wireless network 100 may extend its range for providing wireless communication by implementing a routing means, shown as a wireless router 120 (or "router 120"). The wireless router 120 is capable of receiving a packet, amplifying the packet, and broadcasting the amplified packet so that the amplified packet may be received by a wireless client means, another wireless router means, or a wireless transmitter means. Accordingly, communication channels utilized by the wireless router 120 are indicated in FIG. 1 by the bidirectional arrows 122. It is also useful here to define the "upstream" pathway as the path of data, packets, or information that flows from a wireless client to the wireless server 140.

The wireless server 140 may be implemented as any personal computer, handheld device, Internet appliance, or other computing platform capable of executing software algorithms needed to enable the personal wireless network 100. Furthermore, the wireless server 140 may integrally include the wireless transceiving means previously discussed.

In one embodiment, the wireless server 140 may form part of a Local Area Network (LAN). Thus, the wireless server 140 is illustrated as being connected to a second computer 160 (which could be indicative of a LAN server) across a connection 144 that could be an Ethernet connection. In addition, the wireless server 140 may be connected to other networks as part of a Wide Area Network (WAN), a satellite network, or other communication network. Furthermore, the wireless server 140 preferably provides a connection to the Internet 150, or a successor to the Internet 150 through an Internet connection 142. The Internet connection 142 could be a hardwire Internet connection, such as a digital subscriber line (DSL—sometimes called an xDSL), or a wireless Internet connection.

The personal wireless network 100 may be implemented as a home network. Accordingly, when implemented as a home network the personal wireless network 100 is used as a wireless extension of a personal computer within a home. Preferably, a home network implementation transmits video output through a wireless protocol link, such as a Bluetooth communication link or 802.11, to a wireless tablet. Accordingly, at the wireless tablet the user has access to all applications that could execute on a personal computer.

Thus, the wireless tablet could access wireless server 140 to provide television programming, the Internet, or e-books, for example. Furthermore, in a home network, wireless tablets may access other wireless devices, particularly those wireless devices that have the same wireless protocol link. Other wireless devices include wireless repeaters, wireless infrared converters (such as remote controls).

One possible embodiment of the personal wireless network 100 integrates telephone technology into the personal wireless network. For example, a Private Branch Exchange (PBX) interface may be used to provide telephone access to the personal wireless network 100. Thus, a user may have access to his phone calls, and view the receiving caller-ID (CID) phone number when away from his desk by redirecting his personal phone number to the wireless client. Such an implementation may provide for unified messaging, and remote voice mail support.

Figure 2:
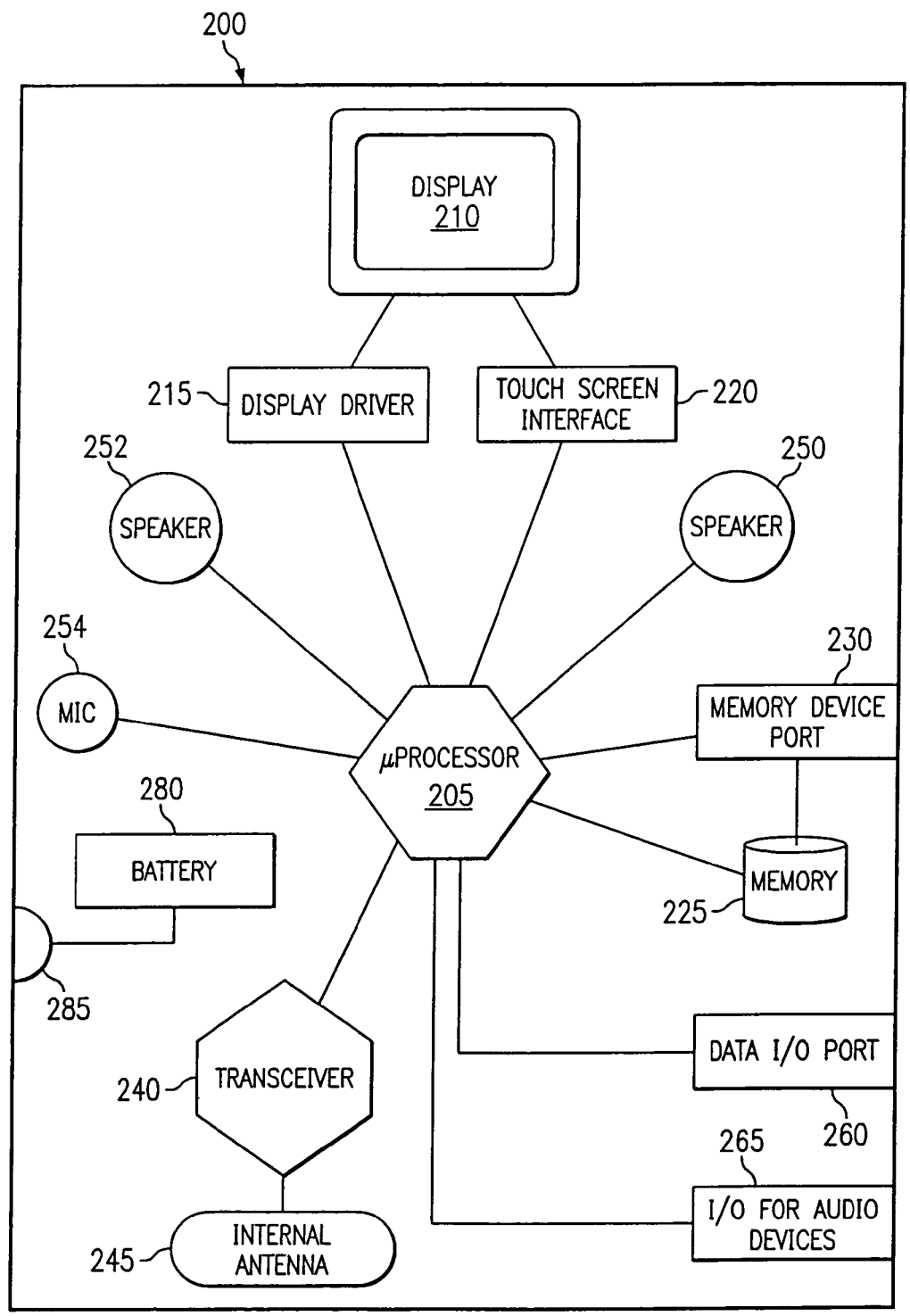
FIG. 2 is a block diagram of one implementation of a wireless tablet.

A user typically accesses the personal wireless network 100 through a wireless client, such as a wireless tablet. FIG. 2 illustrates a block diagram of one implementation of a wireless tablet 200. Within a housing 205 of the wireless tablet 200, a processor 208 is used to interconnect and drive other components of the wireless tablet 200. Preferably, the processor 208 is a RISC processor, such as a ARM processor, or, more specifically, an Arm 7 Thumb Processor, for example. Of course, other processors can be implemented and used to interconnect and drive other components of the wireless tablet 200. The processor 208 is chosen primarily for size and power consumption rather than raw processing power since the processor 208 needs only to provide adequate processing power to accept data inputs, to compress data packets, to route the data packets to a transceiver 240, to receive video and audio packets from the transceiver 240, and to decompress the data and produce video and audio from the received packets.

Video packets received by the wireless tablet 200 carry video display information which the processor 208 sends to a display 210. The display 210 may be a Liquid Crystal Display (LCD), a plasma display, or any other light-weight and thin display. Preferably, the display 210 is a color display. The display 210 may be complimented with a display driver 215. The display driver 215 maintains the software needed to rapidly convert video packets into displayable video information. Furthermore, the display 210 may also provide touchscreen capabilities and preferably implements touchscreen capabilities through a touchscreen interface 220. The touchscreen interface 220 receives information indicating the location of the display 210 that a user touched. The information indicating the location that the display 210 was touched is then transferred to the processor 208. The processor 208 can use the information, and may convert this information into data indicative of a predefined user input.

Likewise, a mouse and/or keyboard may be used for data and location input. The information from either the mouse and/or keyboard is transferred to the processor 208. The processor 208 can use the information, and may convert this information into data indicative of a predefined user input. In addition to video information, the wireless tablet 200 may also send and receive audio information. In receiving audio information, the wireless tablet 200 will receive audio packets and the processor 208 will send the packets to the codec 235. The codec converts the Audio packets into data, and sends the data to speaker 250 and speaker 252 to produce audible sound. Accordingly, two speakers 250, 252, are shown so that stereo type audio may be provided by the wireless tablet 200. In addition, audio sound may be input into the wireless tablet 200 through a microphone 254, converted to data by the codec 235, sent to the processor 208 which converts the data into Audio packets. In addition, audio sound inputs may be received into the wireless tablet 200 may be streamed as audio through wireless protocols or Ultra High Frequency (UHF) transmissions. In addition, audio inputs and output connections may be provided for external microphones, and for external speakers. Such connections are illustrated in FIG. 2 as the block I/O for Audio Devices 265.

Data, audio, and video are sent and received from the wireless tablet 200 through a transceiver 240 which receives the data, audio, and video preferably via an internal antenna 245. Accordingly, the transceiver 240 is preferably capable of sending and receiving information in a plurality of protocols. Furthermore, the internal antenna 245 may be expandable and elongated such that it would protrude from the wireless tablet 200. Preferably, the wireless transmitter employs a powerful amplifier 242. Accordingly, the amplifier 242 is enabled to amplify signals prior to the signal's transmission from the transceiver bank 240 and antenna 245. The processor 208 is augmented through a memory device 225. The memory 225 preferably provides both RAM and ROM so that the processor 208 may have access to a predefined set of start-up instructions, as well as access to storage for programs that load onto the wireless tablet 200. Programs may be loaded onto the wireless tablet 200 (or copied from the wireless tablet 200) through wireless transmission or through a data input/output port 260. The memory 225 may also maintain software capable of producing an onscreen keyboard which a person may use to key in information into the wireless tablet 200. In addition, the memory 225 may also store other software programs that are used by the wireless table, like a media player for playing MP3 files.

Software programs, external operating systems, data, audio recordings, movies, or other prerecorded information may be placed onto the wireless tablet 200 through a memory device placed in the memory device port 230. The memory device port 230 is preferably a compact-flash port. However, it should be understood that the memory device port 230 may also be a PC card port, a multi-media card port, or any other type of port capable of providing access to a transferable data storage device or data storage medium. In addition, the data input/output port 260 may provide input/output capabilities for hardware input/output devices such as a keyboard, digital camera, or diagnostic devices. Power is provided to the wireless tablet 200 through a battery 280. The batter 280 is preferably a lithium (Li) ion, or other rechargeable battery. However, a power cord connection 285 is provided so that a power cord may be connected directly to the wireless tablet 200 so the battery 280 may be recharged. Furthermore, although no connections are shown from the battery 280 to any of the components of the wireless tablet 200, it should be understood that the battery 280 is connected in such a way as to provide appropriate power to each and every component of the wireless tablet 200.

One of the more complicated processes implemented by the wireless tablet 200 is the registration process whereby the wireless tablet 200 registers with a personal wireless network. FIG. 3 is a process flow diagram of a registration algorithm 300 according to one embodiment of the invention.

First, upon connection between the wireless tablet 200 and the wireless server, a network login should be established. This network login is a verification of the wireless tablet 200 to the wireless server. This ensures security access to software applications on the wireless server. Upon verification of the network login, a complete secure list of software applications is sent to the wireless client 200.

After a connection is established, the wireless client selects an application which then establishes a network registration. In a network registration, the wireless tablet 200 receives a user input. The user input may be as simple as a character, or a location of a display being touched. Accordingly, the network registration also converts the user input into predefined information, and then organizes this information into at least one data packet. Preferably, the user inputs are made in response to the display of a registration page. However, in any event, the data packet may be compressed and transmitted via a wireless protocol to a wireless server.

The wireless server then extracts the information from the data packet in order to check the information to make sure that the user has entered an appropriate input. In other words, the wireless server verifies that the user input indicates that the user is an authorized user. Assuming that the user is an authorized user, the wireless server updates the system to provide access to the person at the wireless client.

Next, the registration algorithm 300 proceeds to a receive video act 320. In the receive video act 320 the wireless tablet 200 receives video via a wireless transmission. The wireless transmission may be packetized video, streamed video, or broadcast video. If the video received is packetized, the wireless tablet 200 converts the packetized video into displayable video so that the registration algorithm 300 may next, in a display video act 330, displays the video information received in the receive video act 320.

Thus, the display video act 330 decompresses the video packet received in the receive video act 320. The display act 330 also extracts display information stored in the video packet which defines the color intensity of each pixel of a display. Next, the display act 330 determines which pixels require a change in color or intensity and directs the display to change those pixels. Accordingly, should a pixel not require a change, the color and intensity of that pixel is maintained. The video display in the display video act 330 is preferably static until user input is received.

Accordingly, in a receive input act 340, the registration 300 receives a user input. The user input received in the receiver input act 340 is then converted into information, the information is packetized, and the packet may be compressed to prepare the information for wireless transport across the network. Next, in a transmit input act 350, the data packet is transmitted across the wireless network. Thus, the wireless tablet 200 is definable as a device which takes user inputs and converts these user inputs into wirelessly transmittable data packets, and is a device which receives video and audio and display that video or plays that audio so that it is user perceivable. The range of the personal wireless network may be extended through the use of a routing means such as a wireless router. FIG. 4 illustrates a block diagram of a wireless router 400 (the router 400). The housing 405 of the router 400 maintains a processor 420. As is the case with the wireless tablet 200, the processor 420 implemented in the router 400 is preferably a RISC processor such as an Arm 7 Thumb processor. The processor 420 controls a transceiver bank 410 through algorithms maintained in a memory 430.

The transceiver bank 410 maintains at least one transceiver capable of sending and receiving audio and video streams, as well as data packets. Preferably, the transceiver bank 410 maintains a plurality of transceivers and is capable of implementing a plurality of wireless protocols. Accordingly, the processor 420 implements control over the plurality of wireless protocols implemented by the transceiver bank 410. Wireless transmissions and receptions are achieved via an antenna 412, which is preferably an intell 1al antenna.

One important function of the router 400 is the amplification of wireless transmissions. Accordingly, the router 400 provides at least one amplifier 440. The amplifier 440 is powered preferably by an extell 1al power source, which is connected to the router 400 through a power plug 445. In addition, the power plug 445 may include transformers needed to convert extell 1al alc power sources into whatever power, frequency, voltage, or amperage is preferred by the amplifier 440. In practice, the processor 420 controls the flow of power amplification into the transceiver bank 410 from the amplifier 440. To facilitate the placement of software into the memory 430, to provide quick programming of the processor 420, and to enable the router 400 to be quickly diagnosed should a problem occur, an input/output port 450 is provided.

FIG. 5 illustrates the functionality of the router 400 as a routing algorithm 500. First, in a receive act 510, the routing algorithm 500 receives a wireless transmission. The wireless transmission may be a video stream, an audio stream, or a data packet. Next, the routing algorithm 500 proceeds to an amplify act 520. In the amplify act 520 the routing algorithm intensifies the signal received in the receive act 510 by increasing its power. In other words, the power of the receive signal is amplified in the amplify act 520. Then, in a transmit act 530, the routing algorithm 500 transmits the amplified signal so that the amplified signal may be received across a wider area than the signal received by the receive act 510.

Additionally, the router 400 may transmit the amplified signal to either another router 400, a wireless transmitter, or a wireless client. The router may also transmit the amplified signal to another device that is not part of the personal wireless network, but one that has the same wireless protocol. The router may also change its wireless protocol to provide for a more appropriate communication link and transmit the amplified signal if the destination device has a different wireless protocol than the received signal.

Of course, additional functionality may be provided by the routing algorithm 500. For example, the routing algorithm 500 may provide screening or filtering capabilities so that signals not intended for a particular router will not be amplified by that router. This provides privacy and prevents the router from wasting power amplifying signals which do not require amplification.

The routing algorithm 500 may also provide for signal adequacy testing. Thus, if the routing algorithm 500 detects that a signal is adequately strong enough to reach a known destination, the routing algorithm 500 will not amplify that signal. This saves power, and reduces the transmission band as used within the router, enabling the router to carry more traffic.

FIG. 6A illustrates a video display system 600 for use in a personal wireless network. In the personal wireless network a wireless tablet 110 receives a video signal 610 from a video broadcaster 620. Within the video broadcaster 620, a plurality of video transceivers 630 receive video signals, such as television channels. Accordingly, each video transceiver is capable of receiving an independent video channel and thus the video broadcaster 620 may support as many different broadcasts as the video broadcaster 620 has video transceivers 630. The channels (or signals) received by the video transceiver 630 are multiplexed by a first multiplexer 640, enabling each channel to be broadcast over a first antenna 642.

Similarly, the channels received by the video transceivers are picked up by a video source, such as a second antenna 662 (similarly, video may be received by a video jack 670 which may be connected to a cable (which is then in communication with a cable television source), or satellite television transmission, for example). The video transmissions received by the second antenna 662, or the video jack 670, are demultiplexed through a second multiplexer 660. The video jack 670 may also be connected to the wireless server to provide access to wireless server applications as well as to the Internet.

A wireless protocol enabled controller 650 (Bluetooth, or 802.11, for example) provides for channel selection, volume control, item selection, and other user interactions between the video broadcaster 620 and the wireless tablet 110. These interactions are typically data packet communications sent from the wireless tablet 110 to the video broadcaster 620 through the wireless connection 615. Thus, the Bluetooth enabled controller 650 directs the second multiplexer 660 to place certain channels through the video transceiver 630 and also directs the channel characteristics prior to these channels being received by the multiplexer 640.

In addition, a user at the wireless tablet 110 may perform a number of interactions with the channels received at the wireless tablet 110. For example, the user at the tablet 110 may select a specific volume, brightness, or other visual display control. Furthermore, the user at the wireless tablet 110 may even play Internet enabled games at the wireless tablet 110 which are broadcast by the video broadcaster 620.

FIG. 6B illustrates an embodiment of a tablet interaction algorithm 680. The two semi-circular arrows of the tablet interaction algorithm 680 illustrate the simultaneous interaction of a tablet act 685 with a CPU act 690. In the tablet act 685 data packets are sent across a wireless link 687 and received by a device capable of data processing. Likewise, in a CPU act 690, a audio and/or video signal is broadcast for reception by a wireless client such as a wireless tablet across a wireless communication channel 692.

Wireless transmissions are generated at a server location and broadcast through a personal wireless network from a wireless transceiving means such as a wireless transmitter. FIG. 7 illustrates one embodiment of a wireless transmitter 700. The wireless transmitter 700 is structurally (hardware-wise) similar to the wireless router 400, and may use a housing 705 similar to the housing 405. However, in addition to an input/output device utilized for diagnostic purposes (illustrated as a port 755), the wireless transmitter 700 includes an input/output port that is dedicated for connection to a server, illustrated as I/O to server block 750 (I/O 750). I/O 750 may be implemented as a card connection for insertion into a motherboard card slot. However, I/O 750 is preferably implemented as a wire based port. For example, I/O 750 could be implemented as a USB port, a parallel port, or a Split-Bridge.

Another difference between the wireless transmitter 700 and the router 400 is that the wireless transmitter 700 has the ability to receive a compressed packet from the wireless server through the I/O 750. Thus, the processor 720 is capable of receiving a packet, and transmitting the packet via a wireless protocol. Similarly, the processor 720 is capable of taking a packet received from the transceiver bank 710 and then sending the packet to the wireless server through the I/O 750, or to a wireless router, or to a wireless client. Accordingly, the routing algorithms needed to determine where the received packet's destination packet needs to be sent are maintained in a memory device 730.

Additionally, when the wireless transmitter 700 receives packets that are not sent to the wireless server, the same criteria is used as the wireless router (this was stated in previous paragraphs explaining FIG. 5). The wireless transmitter 700 is powered through a power plug 745. Preferably, the wireless transmitter employs a powerful amplifier 740. Accordingly, the amplifier 740 is enabled to amplify signals prior to the signal's transmission from the transceiver bank 710 and antenna 712. One preferred method of enabling a common computing platform is to implement a personal wireless network by providing, downloading, and storing a personal wireless network enabling software block 800 on a common computing platform, thus creating a wireless server. FIG. 8 illustrates one embodiment of a personal wireless network software block.

The personal wireless network enabling software block 800 includes an operating system stack 810 which maintains the operating systems needed to implement the personal wireless network. For example, the operating system stack 810 may maintain proprietary operating systems 812, background capable operating systems 814, network operation systems 816, or session management operating systems 818. The operating systems may be available through a common operating system such as an enhanced Windows based operating system, or a proprietary operating system. Then, on top of the operating system stack 810 are placed network enabled applications 820.

Preferably, the network enabled applications 820 are capable of operating in the background of the wireless server. So, a user may access the wireless server and run a software program which is viewable via a monitor or other display device while, at the same time, other users are accessing the wireless server remotely and could, in fact, be running additional instances of the same program (recall that "background" operations enable the person directly accessing the wireless server to do so while being unaware that other persons are remotely accessing the wireless server). Examples of network enabled applications include network enabled games, word processing applications, database applications, scheduling applications, spreadsheet applications, Internet enabled applications, and wireless smart appliance applications.

The personal wireless network enabling software block 800 also includes a communications stack 830. The communications stack 830 includes software capable of implement wireless communication protocol. For example, the communications stack may provide a Home RF protocol 838, an IEEE 802.11 protocol 836, a Bluetooth protocol 834, or a proprietary communication protocol 832, for example. Of course, additional protocols may be provided.

A personal wireless network enabling software block 800 may also provide useful software applications. For example, the personal wireless network enabling software block 800 may provide a data enablement stack 840. The data enablement stack 840 may include voice recognition software 842, or handwriting software 844. Furthermore, the personal wireless network enabling software block 800 could also provide security software 850. Security software 850 could include software that enables a user to register at a wireless client, software capable of identifying and directing packets to appropriate personal wireless networks operating in proximity to each other, and software capable of detecting and alerting the personal wireless network of an intruder.

The personal wireless network enabling software block 800 may also include a compression/decompression block 855. This block issued for receiving streamed data from any of the software blocks within the personal wireless network and convert the streamed data into compressed data using a compression algorithm. When a compressed signal packet is received from the personal wireless network, a decompression algorithm is used. Examples of the types of compression/decompression algorithms may be RLE 856, JPEG 857, or LLE 858, for example. Of course, other types of compression/decompression algorithms may be used.

The operation of a network server may be better understood by examining the processing of a packet received by the wireless server. Accordingly, FIG. 8B provided the process diagrams of a wireless server algorithm 860. First, in a reception act 865 the wireless server algorithm receives a data packet having data. Then, in an association act 870, the wireless server algorithm 860 extracts data from the data packet and associates the data with a software application. Preferably, this software application is a software application executing in the background.

Accordingly, the data is utilized by the wireless server algorithm 860 in a software interaction act 875 to update the appropriate software application executing on the wireless server. Typically, the data will cause the software application to perform a predetermined operation. Of course, a number of variations of these steps are possible. For example, a data packet may be specifically converted into a data stream. Furthermore, the act of receiving may be accomplished through an external transmitter or an internal transmitter. Furthermore, the data packet may require decompression before the data packet may be converted into data.

Typically, the software interaction act 875 will generate a change in software that causes a change in the video display produced by the software. Accordingly, the wireless server algorithm 860 proceeds to a generate video act 880 in which a video stream indicative of a visual display associated with the software application is created. Then, the video stream will be organized into at least one video packet for transmission onto the personal wireless network. Thus, a video packet is transferred directly from a wireless transmitter maintained in the wireless server, or an external wireless transmitter in a transmission act 885.

It should be emphasized that the video stream may be packetized and compressed by the wireless transmitter itself. Furthermore, it should be understood that more than one wireless protocol might be used at any given time. For example, the wireless server may communicate with one wireless client such as a wireless tablet though a wireless protocol, while the wireless server may communication with a second wireless client, such as a wireless smart appliance, through a Home RF protocol. Likewise, it should be understood that audio or video might be broadcast through standard UHF channels.

Thus, having examined the personal wireless network from a system level, as well as by examining some of the devices which may be used by a personal wireless network, one may gain a better understanding of the personal wireless network by looking at the process of user registration in greater detail from a system level perspective. Accordingly, FIG. 9 is a block flow diagram of a personal wireless network processing algorithm 900 (processing algorithm 900).

First, in a start act 905, a user turns on a wireless client. The wireless client displays for the user a registration page which has been preloaded into the ROM of the wireless client. Afterwards, the processing algorithm 900 proceeds to a registration act 910 in which the user will provide a registration page with the requested information (note that it is assumed that the user is an authorized user and that the information provided by the user is valid and correct information needed for registration). Next, the processing algorithm 900 proceeds to a transmission act 916. In the transmission act 916 the information provided by the user in the registration act 910 is converted into packetized data which is broadcast via a predetermined wireless protocol.

In the event that the wireless client is located significantly remotely from a wireless server, the processing algorithm 900 proceeds to a routing act 917 in which the packet from the registration act 910 is received by a wireless router, amplified, and then retransmitted as an amplified signal. Although not shown, the routing act 917 may be repeated numerous times by various wireless routers (as needed) so that the packet transmitted in the transmission act 916 may be received by the wireless transceiver means of the wireless server in a reception act 918. The transmission act 916, the routing act 917, and the reception act 918, may be collectively referred to as a wireless communication act 915.

Following the reception of the packet sent in the transmission act 916, the wireless server processes the packet by extracting data from the packet, associates the data with an executing software program, and then using the software program to process the data. Accordingly, since the data transmitted in the transmission act 916 was data regarding user verification, it will be assumed that the information processed by the software application verifies that the user is an authorized user. Accordingly, the wireless server produces a video signal, such as a Video packet, containing information regarding a welcome screen and transmits the video across on a wireless network in a video transmission act 925. Then, the video transmission is received by the wireless client either as a broadcast, or through a process similar to the wireless communication act 915.

The wireless client next, in a video processing act 930, receives the information broadcasted in the video transmission act 925. In the video processing act 930, the wireless client processes and displays the video information received by the wireless server. The video received is then displayed and remains static at least until a user entry is received. However, it should be noted that the period in which the display is static may be extremely short, such as a 1,000th of a second (or less) in the case of a video movie broadcast (such as when a DVD is being played).

The processing algorithm 900 proceeds to a user entry act 935. In the user entry act 935 the wireless client receives a user entry such as the touching of the display, a voice command, or another entry from a device attached to the wireless client. Then, the wireless client converts the user entry into a transmittable packet and transmits the packet in a data transmit act 940. The packet is routed as previously discussed in the wireless communication act 915, and once received by the wireless server is decompressed, associated with the appropriate executing software program, and is processed in the background as a background processing act 945. If the associated program is not yet executing, the server is instructed to run the program (in other words, to begin the execution of the program).

The processing algorithm 900 continues to a video update act 950. In the video update act 950 the display generated by the executing software is updated to reflect any changes caused by the data received by the wireless server and processed in the background act 945. Accordingly, any changes detected in the video update act are converted into the appropriate video information needed to direct a display device at the wireless client to display the appropriate video output.

Thus, this video information is compressed, packetized and sent to the wireless client through a process similar to the wireless communication act 915 in the video update act 950. Once the video information is received by the wireless client, the wireless client uses the video information to update the display of the wireless client in a display update act 955. Then, the processes of receiving user input(s), and the process of receiving video updates, continue as long as the wireless client is turned on. Of course, it should be noted that audio information may be continuously transmitted from the wireless server to the wireless client.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A wireless personal video network comprising:
   a video display system comprising,
      a wireless transceiver for receiving video signals transmitted wirelessly in the wireless personal video network, wherein the wireless personal video network has a transmission range consistent with at least one 802.11 standard and is operable within the wireless personal video network, and
      a display for displaying the received video signals; and
   a video broadcast system comprising,
      a video input for receiving at least one external video signal for transmission in the wireless personal video network,
      a demultiplexer for demultiplexing the at least one external video signal to generate a plurality of video signals;
      a wireless transmitter for transmitting at least one of the plurality of video signals in the wireless personal video network, and a wireless enabled controller for controlling transmission of the at least one of the plurality of video signals according to a command received wirelessly from the video display system.

2. The network of claim 1 wherein the video input receives a plurality of multiplexed video signals and the video broadcast system further comprises:
 a plurality of transceivers;
 the demultiplexer for demultiplexing the multiplexed video signals received by the video input into separate video signals that are respectively provided to the video transceivers; and
 a multiplexer for multiplexing the separate video signals from the video transceivers prior to transmission in the wireless personal video network.

3. The network of claim 1 wherein the video broadcast system further comprises means for compressing the at least one video signal prior to transmission in the wireless personal video network; and the video display system further comprises means for decompressing the at least one compressed video signal.

4. The network of claim 1 wherein the video input receives at least one broadcast television signal.

5. The network of claim 1 wherein the video input receives at least one cable television signal.

6. The network of claim 1 wherein the video input receives at least one satellite television signal.

7. The network of claim 1 wherein the video input receives at least one video signal via the Internet.

8. The network of claim 1 wherein the video input also receives an audio signal for transmission in the wireless personal video network.

9. The network of claim 1 wherein the at least one video signal is transmitted by the transmitter using Bluetooth communication protocol.

10. The network of claim 1 wherein the at least one video signal is transmitted by the transmitter using IEEE 802.11 communication protocol.

11. A method of receiving and transmitting video signals in a wireless personal video network, the method comprising:
 receiving at least one external video signal at a video input within a video broadcast system for transmission in the wireless personal video network, wherein the wireless personal video network has a transmission range consistent with at least one 802.11 standard and is operable within the wireless personal video network,
 receiving the at least one external video signal from the video input;
 demultiplexing the at least one external video signal to generate a plurality of video signals;
 wirelessly transmitting at least one of the plurality of video signals in the wireless personal video network;
 receiving the transmitted video signal at a wireless transceiver within a remote video display system within the wireless personal video network;
 displaying the received video signal; and
 controlling transmission of the at least one of the plurality of video signals according to a command received wirelessly from the wireless transceiver.

12. The method of claim 11 wherein the at least one external video signal comprises a plurality of multiplexed video signals, and the method further comprises:
 demultiplexing the multiplexed video signals received by the video input into separate video signals that are respectively provided to a plurality of video transceivers;
 multiplexing the separate video signals from the video transceivers; and
 wirelessly transmitting the multiplexed video signals in the wireless personal video network.

13. The method of claim 11 further comprising:
 compressing the at least one video signal prior to transmission in the wireless personal video network; and
 decompressing the at least one compressed video signal.

14. The method of claim 11 wherein the at least one external video signal comprises at least one broadcast television signal.

15. The method of claim 11 wherein the at least one external video signal comprises at least one cable television signal.

16. The method of claim 11 wherein the at least one external video signal comprises at least one satellite television signal.

17. The method of claim 11 wherein the at least one external video signal comprises at least one video signal via the Internet.

18. The method of claim 11 further comprising:
 receiving an audio signal at the video input for transmission in the wireless personal video network.

19. The method of claim 11 further comprising:
 transmitting the at least one video signal using Bluetooth communication protocol.

20. The method of claim 11 further comprising:
 transmitting the at least one video signal using IEEE 802.11 communication protocol.

* * * * *